US012683368B2

(12) United States Patent
Uno et al.

(10) Patent No.: US 12,683,368 B2
(45) Date of Patent: Jul. 14, 2026

(54) WIRE HARNESS

(71) Applicant: SUMITOMO WIRING SYSTEMS, LTD., Mie (JP)

(72) Inventors: Hiroki Uno, Mie (JP); Yoshiyuki Matsuo, Mie (JP); Kazuya Takahashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 149 days.

(21) Appl. No.: 18/685,173

(22) PCT Filed: Aug. 18, 2022

(86) PCT No.: PCT/JP2022/031198
§ 371 (c)(1),
(2) Date: Feb. 20, 2024

(87) PCT Pub. No.: WO2023/037839
PCT Pub. Date: Mar. 16, 2023

(65) Prior Publication Data
US 2025/0141198 A1     May 1, 2025

(30) Foreign Application Priority Data

Sep. 7, 2021     (JP) ................................. 2021-145147

(51) Int. Cl.
| | |
|---|---|
| *H02G 3/04* | (2006.01) |
| *B60R 16/02* | (2006.01) |
| *H01B 7/00* | (2006.01) |

(52) U.S. Cl.
CPC ....... *H02G 3/0418* (2013.01); *B60R 16/0215* (2013.01); *H01B 7/0045* (2013.01); *H02G 3/0468* (2013.01)

(58) Field of Classification Search
CPC .... B60R 16/0215; H01B 7/40; H01B 7/0045; H02G 3/04; H02G 3/0418; H02G 3/0468
See application file for complete search history.

(56) References Cited

U.S. PATENT DOCUMENTS

| | | | |
|---|---|---|---|
| 2005/0092512 A1 | 5/2005 | Kogure et al. | |
| 2006/0021782 A1* | 2/2006 | Tsubaki | ............... H02G 3/0468 |
| | | | 174/72 A |

(Continued)

FOREIGN PATENT DOCUMENTS

| | | |
|---|---|---|
| JP | 2003-018727 A | 1/2003 |
| WO | 2012/111179 A1 | 8/2012 |

OTHER PUBLICATIONS

International Search Report issued on Oct. 11, 2022 for WO 2023/037839 A1 (4 pages).

*Primary Examiner* — Paresh Paghadal
(74) *Attorney, Agent, or Firm* — Venjuris, P.C.

(57) ABSTRACT

A wire harness includes: a protector including an accommodating portion and an attachment portion; an electric wire passing through the accommodating portion; a corrugated tube covering the electric wire and including a small-diameter tube portion and a large-diameter tube portion that are alternately continuous with each other; and a fastening member fastening the corrugated tube and the attachment portion by being wound around the corrugated tube and the attachment portion. The attachment portion has a rib that protrudes from an extension portion toward the small-diameter tube portion of the corrugated tube and is fitted into a recessed portion provided on an outer side of the small-diameter tube portion. A part of the corrugated tube that extends in a circumferential direction thereof is covered by the attachment portion, and another part of the corrugated tube is fastened toward the attachment portion by the fastening member.

13 Claims, 9 Drawing Sheets

(56)             References Cited

U.S. PATENT DOCUMENTS

| | | | |
|---|---|---|---|
| 2006/0131048 A1* | 6/2006 | Kogure | B60R 16/0215 |
| | | | 174/72 A |
| 2016/0144809 A1* | 5/2016 | Kogure | B60R 16/0215 |
| | | | 296/146.12 |
| 2016/0284440 A1 | 9/2016 | Adachi et al. | |
| 2019/0123530 A1* | 4/2019 | Tokuyama | H02G 3/0468 |
| 2020/0136359 A1 | 4/2020 | Yamauchi et al. | |
| 2021/0291760 A1* | 9/2021 | Sugihara | H02G 3/0691 |

* cited by examiner

WIRE HARNESS

CROSS REFERENCE TO RELATED APPLICATIONS

This application is a national phase of PCT application No. PCT/JP2022/031198, filed on 18 Aug. 2022, which claims priority from Japanese patent application No. 2021-145147, filed on 7 Sep. 2021, all of which are incorporated herein by reference.

TECHNICAL FIELD

The present disclosure relates to a wire harness.

BACKGROUND

Patent Document 1 discloses a wire harness protection tool. The protection tool described in Patent Document 1 has a tubular member through which a wire harness with a corrugated tube can be passed. The tubular member is made by combining two semi-cylindrical members. Each of the two semi-cylindrical members has a rib to be fitted into a recessed portion of the corrugated tube, and the ribs extend over the entire circumference of the corrugated tube when the two semi-cylindrical members are combined to form the tubular member.

PRIOR ART DOCUMENT

Patent Document

Patent Document 1: WO 2012/111179 A1

SUMMARY OF THE INVENTION

Problems to be Solved

It is desirable that one type of protection tool can hold any of corrugated tubes of more diverse diameters.

It is an object to enable one type of protector to hold any of corrugated tubes of more diverse diameters.

Means to Solve the Problem

A wire harness of the present disclosure is a wire harness including: a protector including: an accommodating portion having a first opening and a second opening; and an attachment portion provided on the first opening side of the accommodating portion; an electric wire passing through the accommodating portion via the first opening and the second opening; a corrugated tube including a small-diameter tube portion and a large-diameter tube portion that are alternately continuous with each other, the corrugated tube covering at least an area of the electric wire that extends along the attachment portion; and a fastening member fastening the corrugated tube and the attachment portion by being wound around the corrugated tube and the attachment portion, wherein the attachment portion has: an extension portion extending outside the corrugated tube in an extending direction of the electric wire; and a rib protruding from the extension portion toward the small-diameter tube portion of the corrugated tube and fitted into a recessed portion on an outer side of the small-diameter tube portion, and a part of the corrugated tube that extends in a circumferential direction thereof is covered by the attachment portion, and another part of the corrugated tube is fastened toward the attachment portion by the fastening member.

Effect of the Invention

According to the present disclosure, one type of protector can hold any of corrugated tubes of more diverse diameters.

DETAILED DESCRIPTION TO EXECUTE THE INVENTION

Description of Embodiments of Present Disclosure

Figure 1:
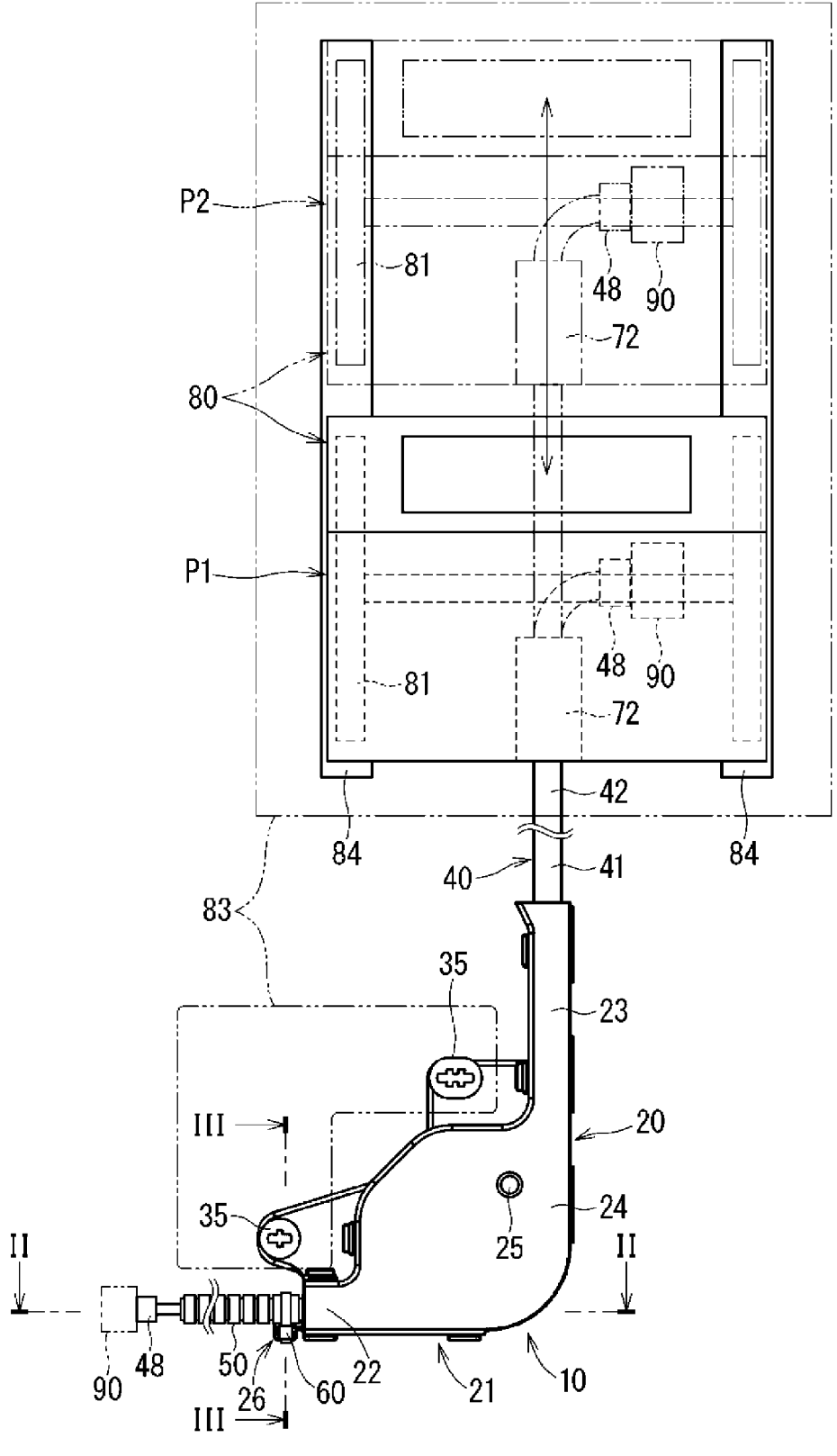
FIG. 1 is a plan view of a wire harness according to Embodiment 1.

Firstly, embodiments of the present disclosure will be listed and described.

A wire harness of the present disclosure is as follows.

(1) A wire harness includes: a protector including: an accommodating portion having a first opening and a second opening; and an attachment portion provided on the first opening side of the accommodating portion; an electric wire passing through the accommodating portion via the first opening and the second opening; a corrugated tube including a small-diameter tube portion and a large-diameter tube portion that are alternately continuous with each other, the corrugated tube covering at least an area of the electric wire that extends along the attachment portion; and a fastening member fastening the corrugated tube and the attachment portion by being wound around the corrugated tube and the attachment portion, wherein the attachment portion has: an extension portion extending outside the corrugated tube in an extending direction of the electric wire; and a rib protruding from the extension portion toward the small-diameter tube portion of the corrugated tube and fitted into a recessed portion on an outer side of the small-diameter tube portion, and a part of the corrugated tube that extends in a circumferential direction thereof is covered by the attachment portion, and another part of the corrugated tube is fastened toward the attachment portion by the fastening member. According to the wire harness configured as described above, a part of the corrugated tube that extends in the circumferential direction is covered by the attachment portion, and the other part of the corrugated tube is fastened toward the attachment portion by the fastening member, thereby keeping the rib of the attachment portion fitted into the recessed portion on the outer side of the small-diameter tube portion. Instead of the attachment portion not covering the entire circumference of the corrugated tube, the fastening member is provided in the area of the corrugated tube that is not covered by the attachment portion. Thus, the attachment portion and the fastening member make it possible to deal with corrugated tubes of diverse diameters.

(2) In the wire harness according to the item (1), the rib may be provided at only one location in an extending direction of the extension portion. This makes it easy for the rib to be fitted into the recessed portion on the outer side of the small-diameter tube portion, even for two or more types of corrugated tubes having different spacings between the small-diameter tube portions in the extending direction.

(3) In the wire harness according to the item (1) or (2), the attachment portion may have a restricting portion that is provided on an outer side of the extension portion and restricts a position of the fastening member. This makes it unlikely for the fastening member to be displaced relative to the attachment portion.

(4) In the wire harness according to any one of the items (1) to (3), the fastening member may be provided at the same position as the rib in the extending direction of the extension portion. With this configuration, the fastening member fastens the area of the corrugated tube on the side opposite to the side where the rib is located in the circumferential direction, making it unlikely for the rib to come off from the small-diameter tube portion.

(5) In the wire harness according to any one of the items (1) to (4), the corrugated tube may be fixed to the electric wire, the protector may be fixed to the electric wire via the corrugated tube on the first opening side and need not be fixed to the electric wire on the second opening side, and the electric wire may include a retractable section that is pulled out from and retracted into the protector through the second opening. With this configuration, the electric wire being fixed to the protector via the corrugated tube on the first opening side allows the pull-out/retract operation to be smoothly performed to the retractable section on the second opening side.

(6) In the wire harness according to the item (5), the accommodating portion may have: a passage portion having the second opening; and an accommodation body that is connected to the passage portion and is larger than the passage portion, and the accommodation body may accommodate the electric wire corresponding to a difference between a wire length in the accommodating portion in a state where the retractable section has been retracted and a wire length in the accommodating portion in a state where the retractable section has been pulled out. With this configuration, it is possible to easily accommodate, in the accommodating portion, the electric wire corresponding to the difference between the wire length within the accommodating portion in the state where the retractable section has been retracted and the wire length within the accommodating portion in the state where the retractable section has been pulled out.

(7) In the wire harness according to the item (6), the electric wire may have a loop portion accommodated in the accommodation body, the accommodating portion may have a pin extending through the loop portion, and the loop portion around the pin in the state where the retractable section has been retracted may be larger than the loop portion around the pin in the state where the retractable section has been pulled out. This enables the pin to restrict the position of the loop portion of the electric wire, thus allowing the pull-out/retract operation to be smoothly performed to the retractable section.

(8) In the wire harness according to the item (7), the protector may include: a body portion having a bottom portion and a side wall portion; and a lid portion serving as a lid of the body portion, and a first extension area of the electric wire may pass on the body portion side relative to an second extension area of the electric wire at an intersection portion where the first extension area intersects the second extension area, the first extension area being an area of the electric wire that extends from an intermediate area of the loop portion toward the first opening, the second extension area of the electric wire being an area that extends from the intermediate area of the loop portion toward the second opening. With this configuration, when the protector is disposed such that the body portion is located vertically below the lid portion, the second extending portion of the electric wire overlaps the first extending portion and is located vertically above the first extending portion. As a result, the pull-out/retract operation can be smoothly performed even if the first extension area and the second extension area rub against each other at the intersection portion during the pull-out/retract operation performed to the retractable section.

(9) In the wire harness according to any one of the items (6) to (8), an end portion of the passage portion may have a shape whose cross-sectional area gradually increases toward the second opening. This makes it unlikely for the electric wire to be caught at an edge of the second opening when the retractable section is pulled out or retracted.

(10) In the wire harness according to any one of the items (5) to (9), the protector may include a vehicle fixing portion that is to be fixed to a vehicle body, the electric wire may have an outer section located outside the second opening of the protector in a state where the retractable section has been retracted into the protector, and the outer section of the electric wire may be fixed to a movable member that is movable relative to the vehicle body. With this configuration, the area of the electric wire on the first opening side is fixed to the vehicle body together with the protector, and the outer section of the electric wire moves relative to the vehicle body together with the movable member. Therefore, when the movable member moves, the retractable section of the electric wire is pulled out from or retracted into the protector. Even in this case, the wire harness is prevented from interfering with movement of the movable member since the retractable section can be smoothly pulled out or retracted.

(11) In the wire harness according to any one of the items (5) to (10), the electric wire and the corrugated tube may be fixed by winding an adhesive tape therearound on the second opening side relative to the rib. With this configuration, the portion at which the electric wire and the corrugated tube are fixed is located on the second opening side relative to the rib, thus making it unlikely for the corrugated tube to be displaced relative to the electric wire during the pull-out/retract operation.

(12) In the wire harness according to any one of the items (1) to (11), a protruding dimension of the rib from the extension portion may be smaller than or equal to a height from the small-diameter tube portion to the large-diameter tube portion of the corrugated tube. This configuration prevents the rib from pushing the small-diameter tube portion when the fastening member fastens the corrugated tube, thereby suppressing excessive deformation of the corrugated tube. As a result, the corrugated tube can be prevented from being excessively deformed and weakening the locking between the rib and the corrugated tube.

(13) In the wire harness according to any one of the items (1) to (12), the rib may be smaller than or equal to the recessed portion on the outer side of the small-diameter tube portion, in the extending direction of the electric wire. This configuration prevents the rib from pushing the corrugated tube when the fastening member fastens the corrugated tube, thereby suppressing excessive deformation of the corrugated tube. As a result, the corrugated tube can be prevented from being excessively deformed and weakening the locking between the rib and the corrugated tube.

(14) In the wire harness according to any one of the items (1) to (13), an outer diameter of the electric wire may be smaller than an inner diameter of the corrugated tube, and the corrugated tube may be deformed such that a first end portion and a second end portion thereof in the circumferential direction overlap each other in a radial direction, and the fastening member may maintain the deformed state. This configuration can realize different diameters using one type of corrugated tube. Since the corrugated tube is maintained in the deformed state in which the first end portion of the circumferential direction and the second end portion overlap each other in the radial direction, there is less room for further deformation of the corrugated tube. Thus, the rib can be prevented from coming off from the small-diameter tube portion due to further deformation of the corrugated tube.

Details of Embodiments of Present Disclosure

Specific examples of the wire harness of the present disclosure will be described below with reference to the drawings. It should be noted that the present disclosure is not limited to these examples but is defined by the claims, and is intended to include all changes made within the meaning and scope equivalent to the claims.

Embodiment 1

Figure 2:
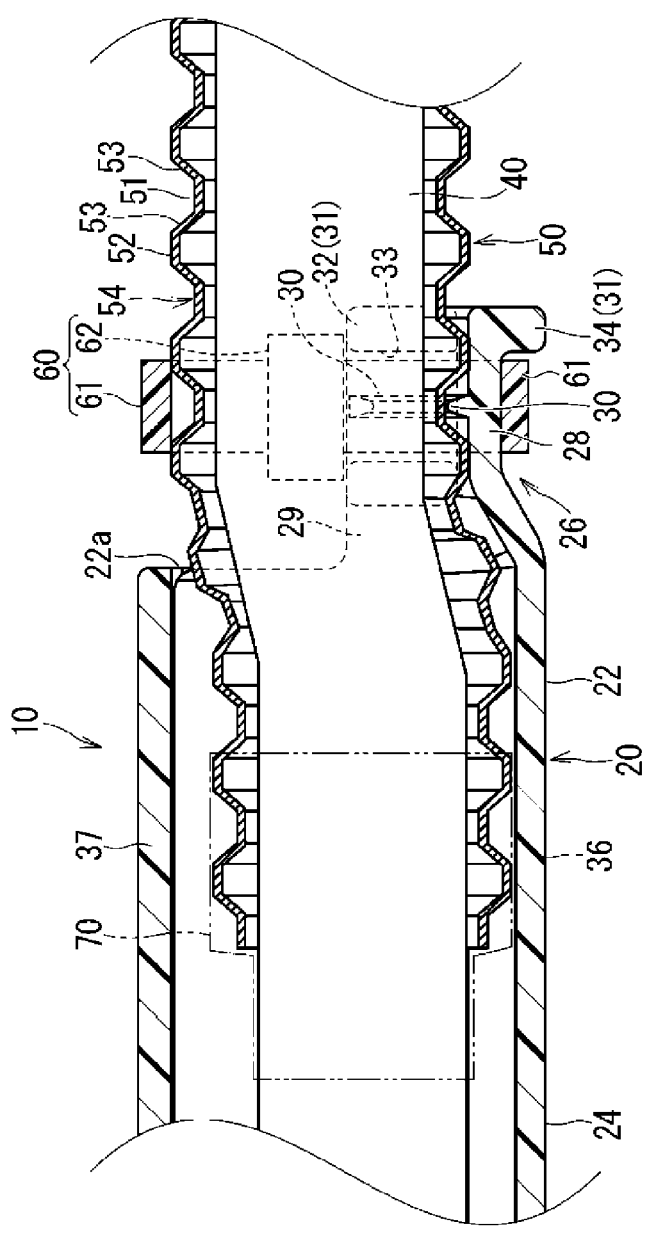
FIG. 2 is a cross-sectional view taken along a line II-II in FIG. 1.
Figure 3:
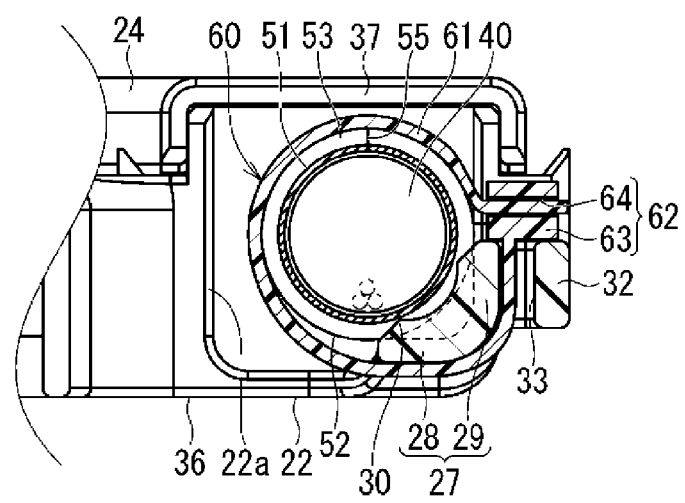
FIG. 3 is a cross-sectional view taken along a line III-III in FIG. 1.
Figure 4:
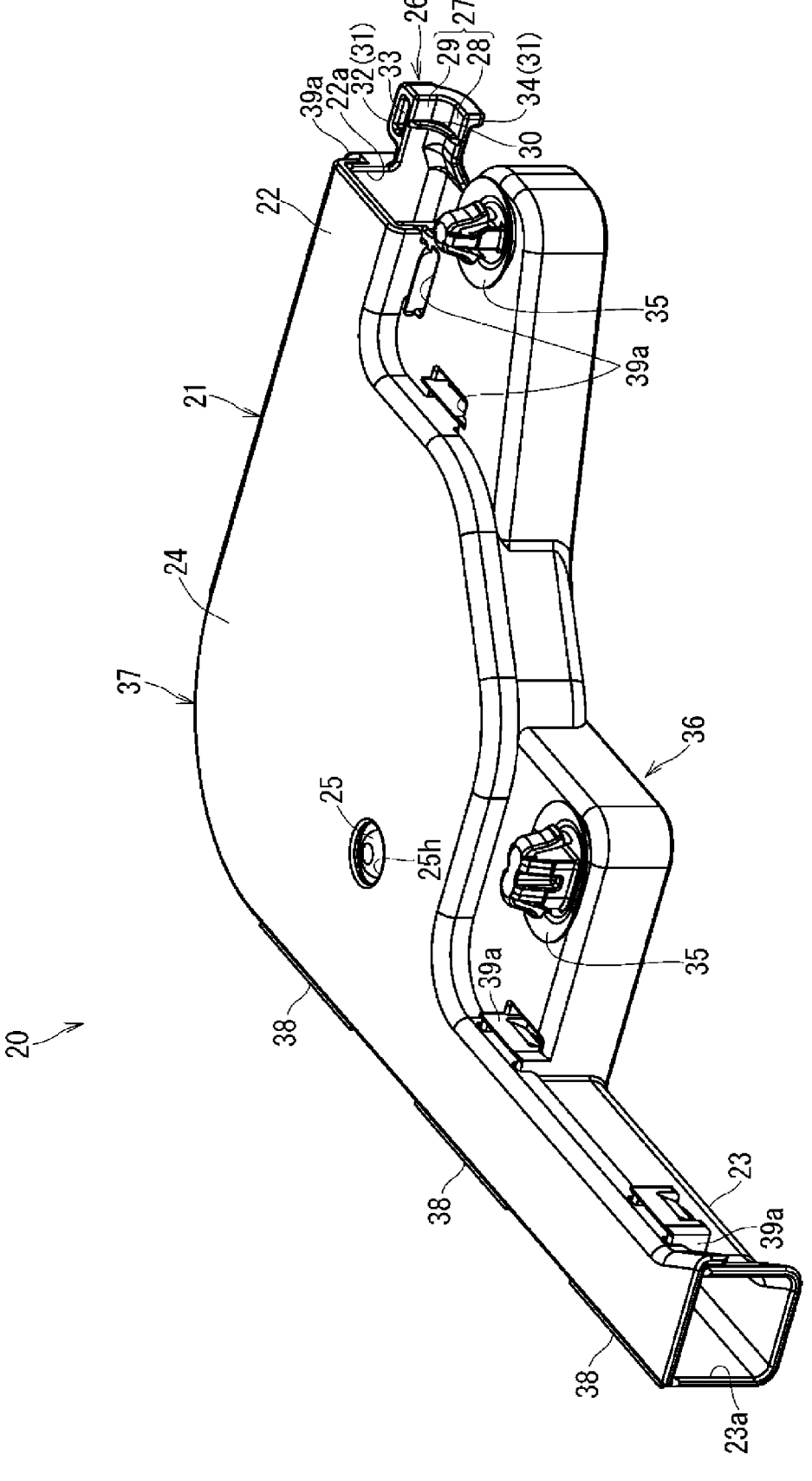
FIG. 4 is a perspective view of a protector in a closed state.
Figure 5:
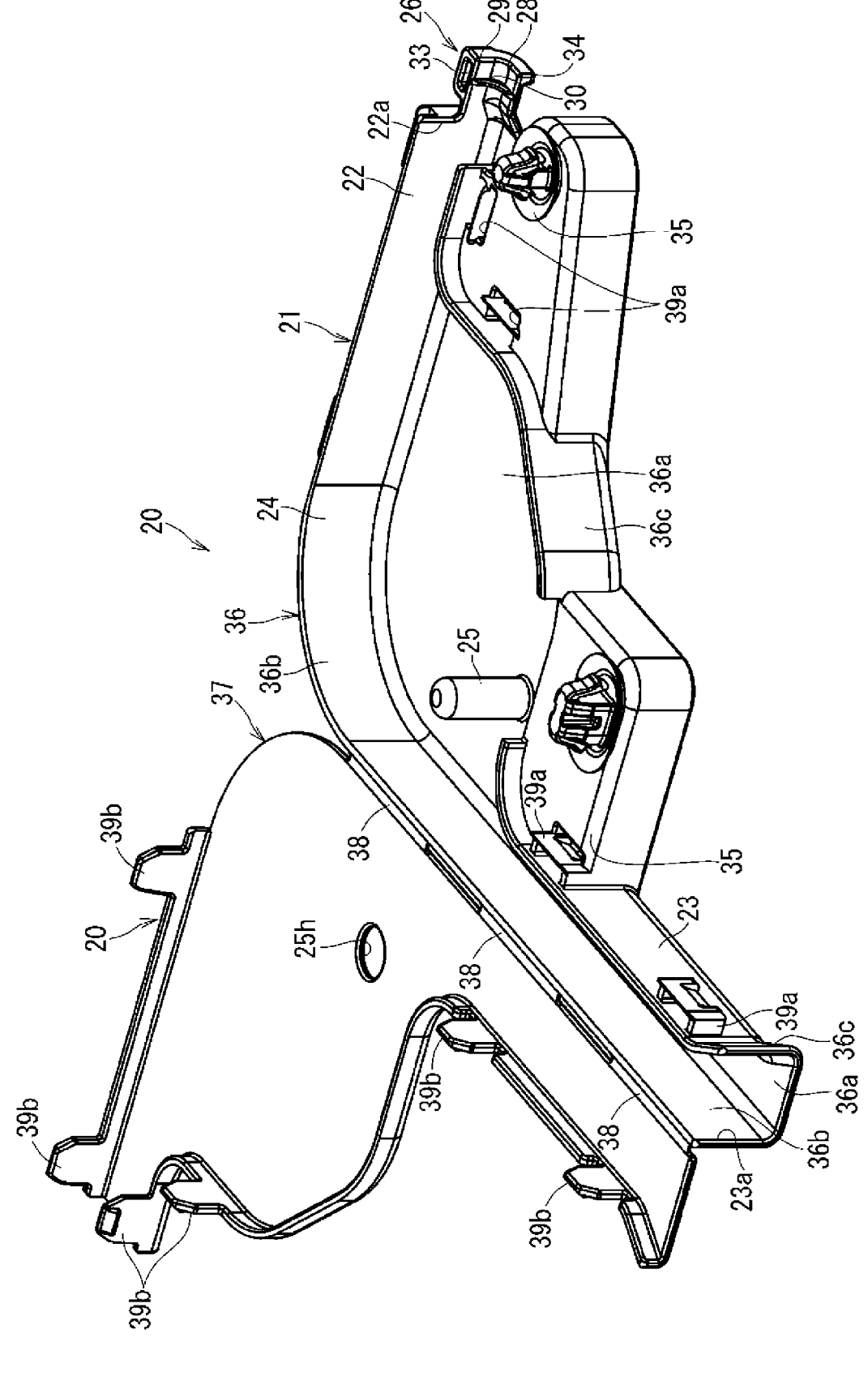
FIG. 5 is a perspective view of the protector in an open state.

The following is a description of a wire harness according to Embodiment 1. FIG. 1 is a plan view of a wire harness 10 according to Embodiment 1. FIG. 2 is a cross-sectional view taken along a line II-II in FIG. 1. FIG. 3 is a cross-sectional view taken along a line III-III in FIG. 1. FIG. 4 is a perspective view of a protector 20 in a closed state. FIG. 5 is a perspective view of the protector 20 in an open state.

The wire harness 10 includes a protector 20, an electric wire 40, a corrugated tube 50, and a fastening member 60. The protector 20 and the corrugated tube 50 are attached to the electric wire 40. The protector 20 and the corrugated tube 50 overlap in one section in the extending direction of the electric wire 40. The fastening member 60 is provided at a location where the protector 20 and the corrugated tube 50 overlap. The fastening member 60 keeps the protector 20 and the corrugated tube 50 overlapping.

The protector 20 includes an accommodating portion 21 and an attachment portion 26. The protector 20 also includes vehicle fixing portions 35. The protector 20 is, for example, a molded product made of resin.

The accommodating portion 21 has a first opening 22a and a second opening 23a. The first opening 22a is provided at a first end portion of the accommodating portion 21 in the extending direction. The second opening 23a is provided at a second end portion of the accommodating portion 21 in the extending direction. The accommodating portion 21 has a bent portion between the first opening 22a to the second opening 23a in a plan view.

The accommodating portion 21 in this example has a first passage portion 22, a second passage portion 23, and an accommodation body 24. The first passage portion 22 is provided at the first end portion of the accommodating portion 21 in the extending direction. The first opening 22a is provided in the first passage portion 22. The first passage portion 22 has the first opening 22a. The second passage portion 23 is provided at the second end portion of the accommodating portion 21 in the extending direction. The second opening 23a is provided in the second passage portion 23. The second passage portion 23 has the second opening 23a. The accommodation body 24 is connected to the first passage portion 22 and the second passage portion 23. The accommodation body 24 is provided between the first passage portion 22 and the second passage portion 23. The first passage portion 22 and the second passage portion 23 extend in different directions from the accommodation body 24. The second passage portion 23 is longer than the first passage portion 22. The second passage portion 23 may alternatively have the same length as or be shorter than the first passage portion 22.

An end portion of the first passage portion 22 on the first opening 22a side has a uniform cross-sectional area. An end portion of the first passage portion 22 on the accommodation body 24 side has a shape having a cross-sectional area that gradually increases toward the accommodation body 24.

An end portion of the second passage portion 23 on the second opening 23a side has a shape having a cross-sectional area that gradually increases toward the second opening 23a. An end portion of the second passage portion 23 on the second opening 23a side gradually expands toward the second opening 23a. An end portion of the second passage portion 23 on the accommodation body 24 side has a shape having a cross-sectional area that gradually increases toward the accommodation body 24. An intermediate portion of the second passage portion 23 has a uniform cross-sectional area.

The accommodation body 24 is wider than each of the first passage portion 22 and the second passage portion 23. The extending direction of the first passage portion 22 and the extending direction of the second passage portion 23 are orthogonal to each other. The accommodation body 24 bulges on the inner circumferential side compared to the case where the first passage portion 22 and the second passage portion 23 extend until these portions intersect each other.

The accommodating portion 21 has a pin 25. The pin 25 is provided in the accommodation body 24. The pin 25 restricts the path of the electric wire 40 in the accommodation body 24.

The attachment portion 26 is provided on the first opening 22a side of the accommodating portion 21. The attachment portion 26 has an extension portion 27 and a rib 30. The attachment portion 26 in this example also has a restricting portion 31.

The extension portion 27 extends outside the corrugated tube 50 in the extending direction of the electric wire 40. The extension portion 27 extends outward of the protector 20 from an end portion of the first passage portion 22. The extension portion 27 has an L-shape and has a bottom portion 28 and one side wall 29.

The rib 30 protrudes from the extension portion 27 toward a small-diameter tube portion 51 of the corrugated tube 50. The rib 30 is formed so as to be fitted to a recessed portion 54 on the outer side of the small-diameter tube portion 51 of the corrugated tube 50. The number of ribs 30, as well as the position, shape, size, and the like of the rib 30 are not specifically limited, and may be set as appropriate within the range where the rib(s) 30 can be fitted to the recessed portion(s) 54 of the corrugated tube 50.

Regarding the number of ribs 30, here, only one rib 30 is formed. Accordingly, the rib 30 is provided at only one location in the extending direction of the extension portion 27. Further, the rib 30 is provided at only one location in the circumferential direction of the electric wire 40. A plurality of ribs 30 may alternatively be formed along the extending direction of the extension portion 27. Alternatively, a plurality of ribs 30 may be formed separately in the circumferential direction of the electric wire 40 on the extension portion 27.

Regarding the position of ribs 30, here, the rib 30 is formed at an intermediate portion of the extension portion 27 in the extending direction. The rib 30 extends between the bottom portion 28 and the side wall 29 of the extension portion 27.

Regarding the shape of the rib 30, the rib 30 is formed such that a leading end portion thereof is thinner than a base end portion connected to the bottom portion 28 and the side wall 29. Here, the rib 30 is formed such that a cross-section thereof orthogonal to the circumferential direction has a triangular shape. The leading end portion of the rib 30 that faces an outer face of the small-diameter tube portion 51 is rounded. This makes it unlikely for the small-diameter tube portion 51 to be damaged even if the leading end portion of the rib 30 comes into contact with the small-diameter tube portion 51.

Regarding the size of the rib 30, here, the rib 30 has a height dimension larger than the width dimension (the dimension in the extending direction of the extension portion 27) of the base end portion.

The restricting portion 31 is provided on the outer side of the extension portion 27. The restricting portion 31 restricts the position of the fastening member 60. The restricting portion 31 has a band insertion portion 32 and a protruding portion 34.

The band insertion portion 32 allows a cable tie 60, which serves as the fastening member 60, to pass therethrough. The band insertion portion 32 has a facing part that faces the extension portion 27, and a pair of connecting parts that connect the facing part to the extension portion 27. The insertion hole 33 is an area surrounded by the extension portion 27, the facing part, and the pair of connecting parts.

The band insertion portion 32 is provided on an outer face of the side wall 29 of the extension portion 27. The axial direction of the insertion hole 33 is parallel with the height direction of the side wall 29. With this configuration, the rib 30 and the band insertion portion 32 can be formed using a simple mold that is vertically pulled along the axial direction of the insertion hole 33.

The rib 30 is provided at the same position, in the extending direction of the extension portion 27, as the band insertion portion 32. The rib 30 is smaller than the insertion hole 33 in the extending direction of the extension portion 27. The center of the rib 30 is located at the same position as the center of the insertion hole 33 in the extending direction of the extension portion 27.

The protruding portion 34 is provided on the leading end side of the extension portion 27 relative to the insertion hole 33. Here, the protruding portion 34 is provided at a leading end of the extension portion 27. The protruding portion 34 may be provided over the entire periphery of the L-shaped extension portion 27. Here, a part of the protruding portion 34 also serves as a joint portion of the band insertion portion 32. The protruding portion 34 is located next to the insertion hole 33. The protruding dimension of the protruding portion

34 from the extension portion 27 may be any dimension as long as the fastening member 60 can be prevented from moving over the protruding portion 34, and may be, for example, the same as or larger than the thickness of the band 61. The protruding dimension of the protruding portion 34 from the extension portion 27 may also be about the same as the spacing between the outer face of the extension portion 27 and the inner face of the facing part.

The vehicle fixing portions 35 are portions for fixing the protector 20 to a vehicle. Here, the vehicle fixing portions 35 are clips 35. The vehicle fixing portions 35 may alternatively be screw holes or the like. Here, two vehicle fixing portions 35 are provided on the side of the accommodating portion 21.

The protector 20 has a body portion 36 and a lid portion 37. The body portion 36 has a part of the accommodating portion 21, the attachment portion 26, and the vehicle fixing portions 35. The lid portion 37 serves as a lid of the body portion 36. The lid portion 37 has another part of the accommodating portion 21. The accommodating portion 21 is constituted by the body portion 36 and the lid portion 37. The attachment portion 26 is provided in the body portion 36. An area of the accommodating portion 21 that is provided in the body portion 36 has a tub-like shape having a bottom portion 36a and a pair of side walls 36b and 36c. An upper portion of the area of the accommodating portion 21 that is provided in the body portion 36 is open. The lid portion 37 closes the upper opening of the area of the accommodating portion 21 that is provided in the body portion 36. The pin 25 is provided in the accommodation body 36. The lid portion 37 has a pin hole 25h for allowing the pin 25 to pass therethrough. The pin 25 extends through the lid portion 37. Thus, the pin 25 extends from an inner face of the bottom portion of the body portion 36 to an inner face of the lid portion 37.

The body portion 36 and the lid portion 37 are connected via hinges 38. The hinges 38 are provided in the side wall 36b. The hinges 38 are provided in an area of the side wall 36b that is located at the second passage portion 23 and an area of the accommodation body 24 that extends straight from the second passage portion 23. The body portion 36 and the lid portion 37 can be opened and closed via hinges 38.

The body portion 36 and the lid portion 37 can be locked at the closed position by locking portions 39a and counterpart locking portions 39b. The locking portions 39a are provided in the body portion 36, and the counterpart locking portions 39b are provided in the lid portion 37. A plurality of pairs of the locking portion 39a and the counterpart locking portion 39b are provided. Here, some pairs of the locking portion 39a and the counterpart locking portion 39b are provided in the side wall 36c where the hinges 38 are not provided. Other pairs of the locking portion 39a and the counterpart locking portion 39b are provided in an area of the side wall 36b with the hinges 38 that is located at the first passage portion 22 and an area of the accommodation body 24 that extends straight from the second passage portion 23.

The protector 20 is an integral molded product obtained by means of molding so as to have the body portion 36, the lid portion 37, and the hinges 38. The protector 20 may alternatively be configured such that the hinges 38 are not provided, and the body portion 36 and the lid portion 37 are separate components. The body portion 36 and the lid portion 37 may be molded separately. It is favorable that the body portion and the lid portion in this case are provided with the locking portions 39a and the counterpart locking portions 39b at the locations of the hinges 38, instead of the hinges 38.

The bottom portion 28 of the extension portion 27 is connected to the bottom portion 36a of the body portion 36. The side wall 29 of the extension portion 27 is connected to the side wall 36b of the body portion 36. The body portion 36 has the side wall 36b that the extension portion 27 does not have. In the path that curves from the first passage portion 22 to the second passage portion 23, the side wall 36b is located on the outer circumferential side, and the side wall 36c is located on the inner circumferential side. In the path that curves from the first passage portion 22 to the second passage portion 23, the side wall 36c bulges toward the inner circumferential side, expanding the accommodation body 24. The side wall 29 of the extension portion 27 may alternatively be connected to the side wall 36c of the body portion 36.

The bottom portion 36a of the first passage portion 22 and the bottom portion 28 of the area where the rib 30 is provided are shifted in the height direction. The bottom portion 28 of the area where the rib 30 is provided is higher than the bottom portion 36a of the first passage portion 22. Thus, the protruding portion 34 and the cable tie 60 on the outer side of the bottom portion 28 are prevented from protruding greatly outward of the protector 20. There is a level difference between the bottom portion 36a of the first passage portion 22 and the bottom portion 28 of the area where the rib 30 is provided. To deal with the level difference, the extension portion 27 has an area extending obliquely from the first opening 22a of the first passage portion 22.

The side wall 36c of the second passage portion 23 on the side where the hinges 38 are not provided bulges outward, expanding the second passage section 23. The extending direction of the side wall 36c and the extending direction of the side wall 36b intersect with each other at an end portion of the second passage portion 23 on the second opening 23a side. The width dimension of the bottom portion of the second passage portion 23 gradually increases toward the second opening 23a.

The protector 20 is fixed to the electric wire 40 via the corrugated tube 50 on the first opening 22a side. The protector 20 is not fixed to the electric wire 40 on the second opening 23a side.

The electric wire 40 passes through the accommodating portion 21 via the first opening 22a and the second opening 23a. The electric wire 40 includes at least one electric wire. Here, the electric wire 40 includes a plurality of electric wires. The plurality of electric wires included in the electric wire 40 may be bundled to have a substantially round cross-section. A first end portion of the electric wire 40 extends to the outside of the accommodating portion 21 from the first opening 22a. A second end portion of the electric wire 40 extends to the outside of the accommodating portion 21 from the second opening 23a. The first end portion and the second end portion of the electric wire 40 are each connected to a device 90 via a connector 48 or the like.

Figure 6:
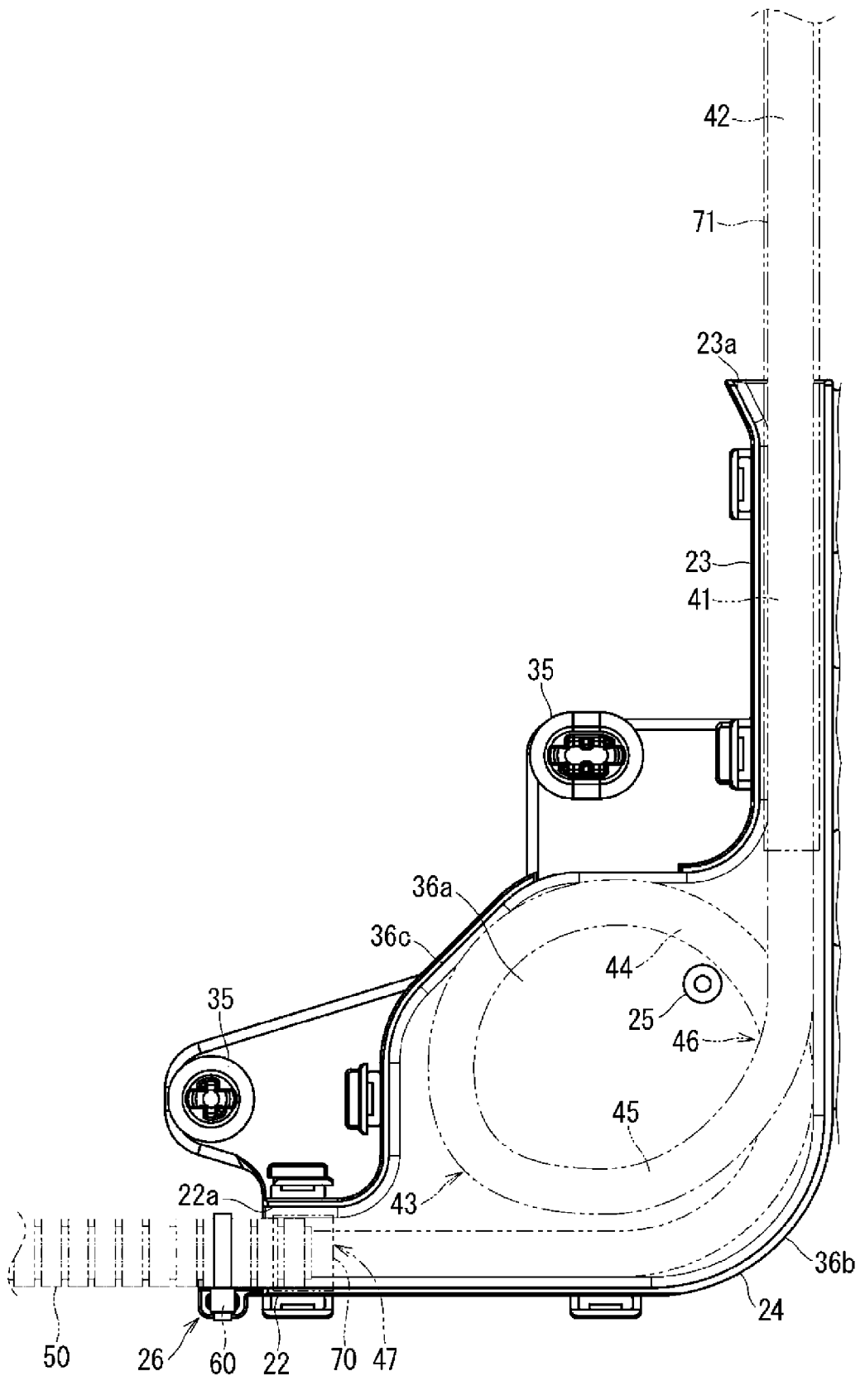
FIG. 6 is a plan view of an electric wire that has been retracted into the protector.
Figure 7:
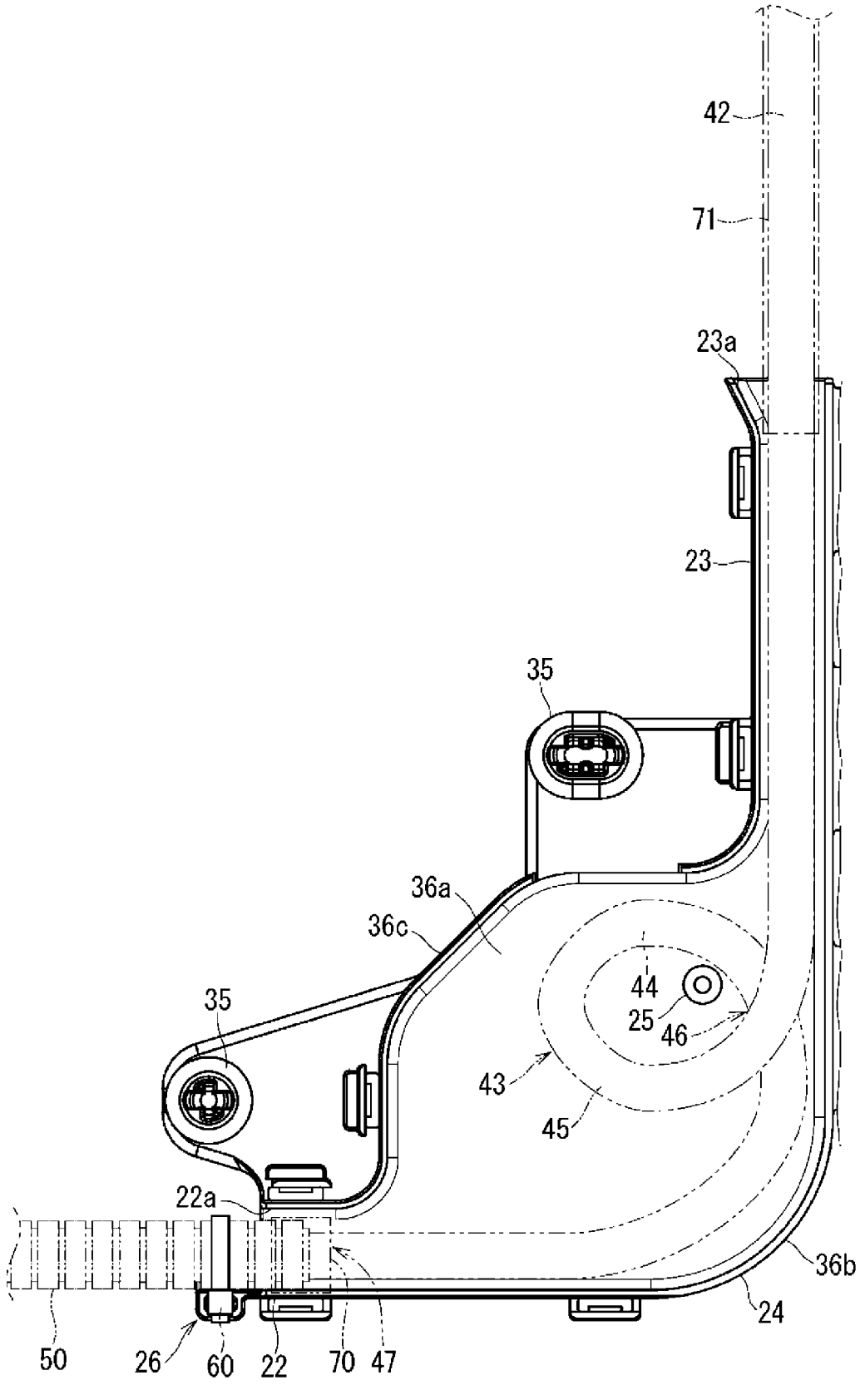
FIG. 7 is a plan view of the electric wire that has been pulled out from the protector.

FIG. 6 is a plan view of the electric wire 40 that has been retracted into the protector 20. FIG. 7 is a plan view of the electric wire 40 that has been pulled out from the protector 20.

The electric wire 40 in this example is pulled out from and retracted into the protector 20. The electric wire 40 includes a retractable section 41. The retractable section 41 is a section that is pulled out from and retracted into the protector 20 through the second opening 23a. The accommodation body 24 accommodates the electric wire 40 corresponding to the difference between the wire length in the accommodating portion 21 in the state where the retractable section 41 has been retracted (the state shown in FIG. 6) and the wire length in the accommodating portion 21 in the state where the retractable section 41 has been pulled out (the state shown in FIG. 7).

The electric wire 40 have an outer section 42. The outer section 42 is a section of the electric wire 40 that is located outside the second opening 23a of the protector 20 in the state where the retractable section 41 has been retracted into the protector 20. The outer section 42 of the electric wire 40 is fixed to a movable member 80, which is movable relative to a vehicle body 82. The outer section 42 moving together with the movable member 80 causes the retractable section 41 to be pulled out from or retracted into the protector 20.

The electric wire 40 has a loop portion 43. The electric wire 40 forms the loop portion 43 in the accommodating portion 21. The loop portion 43 is accommodated in the accommodation body 24. The size of the loop portion 43 changes in conjunction with a pull-out/retract operation performed to the retractable section 41.

Specifically, the pin 25 extends through the loop portion 43. The loop portion 43 around the pin 25 in the state where the retractable section 41 has been retracted (the state shown in FIG. 6) is larger than the loop portion 43 around the pin 25 in the state where the retractable section 41 has been pulled out (the state shown in FIG. 7).

A leading end of the pin 25 is accommodated in the pin hole 25h in the lid portion 37. Therefore, the pin 25 extends from the inner face of the bottom portion 36a of the body portion 36 to a position beyond the inner face of the lid portion 37. With this configuration, even if, for example, the electric wire 40 pushes the lid portion 37 while coming into contact with the pin 25 during the pull-out/retract operation, the electric wire 40 is prevented from being caught between the leading end of the pin 25 and the inner face of the lid portion 37.

A first extension area 44 refers to a section of the electric wire 40 from an intermediate area of the loop portion 43 to the first opening 22a. A second extension area 45 refers to a section of the electric wire 40 from the intermediate area of the loop portion 43 to the second opening 23a. The first extension area 44 and the second extension area 45 intersect each other and form an intersection portion 46. The intersection portion 46 is provided in the electric wire 40 due to having the loop portion 43. At the intersection portion 46, the first extension area 44 passes on the body portion 36 side relative to the second extension area 45.

The second passage portion 23 may have a length corresponding to the retractable section 41. This enables the retractable section 41 to extend straight in the protector 20. Further, even if the retractable section 41 has been retracted into the accommodating portion 21 to the maximum degree, the retractable section 41 does not reach the intersection portion 46.

A twisted tube 71 may be provided on the retractable section 41 of the electric wire 40. The twisted tube 71 is a protecting member made of a textile, such as woven cloth. The twisted tube 71 is flexible. The twisted tube 71 has better flexibility than the corrugated tube 50. A first end portion of the twisted tube 71 may be accommodated in the protector 20 in the state where the retractable section 41 has been pulled out, as shown in FIG. 7. The first end portion of the twisted tube 71 may alternatively be located outside the protector 20 in the state where the retractable section 41 has been pulled out. In the examples shown in FIGS. 6 and 7, the first end portion of the twisted tube 71 does not reach the loop portion 43. The first end portion of the twisted tube 71 may alternatively reach the loop portion 43. The twisted tube 71 may alternatively be provided in the first extension area 44 and the second extension area 45 that intersect each other at the intersection portion 46. A second end portion of the twisted tube 71 may reach a later-described seat protector 72, for example.

The corrugated tube 50 includes small-diameter tube portions 51 and large-diameter tube portions 52. The corrugated tube 50 is, for example, a molded product made of resin, such as PP (polypropylene). The small-diameter tube portions 51 and the large-diameter tube portions 52 are alternately continuous with each other. The central axis of the small-diameter tube portions 51 coincides with the central axis of the large-diameter tube portions 52. The small-diameter tube portions 51 and the large-diameter tube portion 52 coaxially expand about one central axis. The corrugated tube 50 covers at least an area of the electric wire 40 that extends along the attachment portion 26. In the corrugated tube 50, connecting walls 53 each connect the thinnest area of a corresponding small-diameter tube portion 51 to the thickest areas of a corresponding large-diameter tube portions 52. Each connecting wall 53 expands in the radial direction from the thinnest area of the corresponding small-diameter tube portion 51 toward the thickest area of the corresponding large-diameter tube portion 52. An area surrounded by the thinnest area of each small-diameter tube portion 51 and two connecting walls 53 sandwiching this thinnest area is referred to as a recessed portion 54 on the outer side of the small-diameter tube portion 51 of the corrugated tube 50. The rib 30 is fitted to the recessed portion 54. When the corrugated tube 50 is pulled in the axial direction, the rib 30 is caught by the connecting wall 53 on the pulled side, of the two connecting walls 53.

The protruding dimension of the rib 30 from the extension portion 27 is smaller than or equal to the height from the small-diameter tube portion 51 to the large-diameter tube portion 52. That is, the protruding dimension of the rib 30 from the extension portion 27 is smaller than or equal to the height of the recessed portion 54. The height from the small-diameter tube portion 51 to the large-diameter tube portion 52 is equal to the difference between the radius of the small-diameter tube portion 51 and the radius of the large-diameter tube portion 52. The dimension of the rib 30 in the extending direction of the electric wire 40 is smaller than or equal to the dimension of the small-diameter tube portion 51.

A slit 55 is formed in the corrugated tube 50. The slit 55 is formed over the entire length of the corrugated tube 50 in the axial direction. The corrugated tube 50 can be attached to the electric wire 40 from the side by opening edges that sandwich the slit 55.

The fastening member 60 is wound around the corrugated tube 50 and the attachment portion 26. The fastening member 60 fastens the corrugated tube 50 and the attachment portion 26. The fastening member 60 is provided at the same position as the rib 30 in the extending direction of the extension portion 27.

A part of the corrugated tube 50 that extends in the circumferential direction of the electric wire 40 is covered by the attachment portion 26. Another part of the corrugated tube 50 in the circumferential direction of the electric wire 40 is fastened toward the attachment portion 26 by the fastening member 60.

The fastening member 60 is the cable tie 60. The cable tie 60 has a band 61 and a band fixing portion 62. The band 61 is wound around the corrugated tube 50 and the attachment portion 26. The band fixing portion 62 is provided at a base end of the band 61. The band fixing portion 62 fixes a leading end of the band 61. The band fixing portion 62 has a base 63 and a through-hole 64. The base 63 is formed, for example, in a rectangular-parallelepiped shape. The band 61 extends from an outer face of the base 63. The through-hole 64 extends through the base 63. A leading end portion of the band 61 is passed through the through-hole 64 and fixed. For example, a locking protrusion is provided on an inner face of the through-hole 64. The band 61 has a plurality of recesses. When the leading end portion of the band 61 is passed through the through-hole 64, the locking protrusion is selectively locked at one of the plurality of recesses.

The band 61 passes through the insertion hole 33 in the band insertion portion 32. This restricts the position of the band 61 in the extending direction of the extension portion 27. The base 63 is formed so as to be larger than the insertion hole 33, and cannot be inserted into the insertion hole 33. As a result, the base 63 is caught on the periphery of the insertion hole 33 in the band insertion portion 32, and the cable tie 60 is prevented from rotating in the circumferential direction of the electric wire 40.

The width dimension of the band 61 is larger than or equal to the width dimension of the rib 30. The width dimension of the band 61 may be larger than the spacing between adjacent large-diameter tube portions 52. In this case, the band 61 is not fitted into the recessed portion 54 on the outer side of the small-diameter tube portion 51, but fastens the corrugated tube 50 from the outside of the large-diameter tube portion 52. The width dimension of the band 61 may alternatively be smaller than or equal to the spacing between adjacent large-diameter tube portions 52. In this case, the band 61 may alternatively be fitted into the recessed portion 54 on the outer side of the small-diameter tube portion 51, and fasten the small-diameter tube portion 51 or the connecting wall 53.

The protruding portion 34 is provided on the leading end side of the extension portion 27 relative to the band 61. With this configuration, if the band 61 shifts toward the leading end side of the extension portion 27, the band 61 is caught by the protruding portion 34 and prevented from further shifting. This configuration prevents the area of the band 61 that fastens the bottom portion 28 of the extension portion 27 from coming off outward of the protector 20 in the extending direction of the extension portion 27.

An end portion of the corrugated tube 50 is located on the second opening 23a side relative to the fastening member 60. The end portion of the corrugated tube 50 may alternatively be located within the accommodating portion 21. The end portion of the corrugated tube 50 may be accommodated near the first opening 22a. It is preferable that the end portion of the corrugated tube 50 does not reach the loop portion 43. The end portion of the corrugated tube 50 is accommodated in the first passage section 22.

The electric wire 40 and the corrugated tube 50 are fixed by winding the adhesive tape 70 therearound. The electric wire 40 has a tube fixing portion 47, which is fixed to the corrugated tube 50. This configuration prevents the corrugated tube 50 from rotating around the electric wire 40. An area (e.g. an end portion) of the corrugated tube 50 that is accommodated in the accommodating portion 21 may alternatively be fixed to the electric wire 40 by the adhesive tape 70. This configuration can fix the electric wire 40 and the corrugated tube 50 near the rib 30. The adhesive tape 70 is wound around the electric wire 40 and the corrugated tube 50. The adhesive tape 70 is located at a position avoiding the rib 30. This configuration prevents the outer face of the corrugated tube 50 from being hidden by the adhesive tape 70 at the position of the rib 30.

The tube fixing portion 47 is provided on the second opening 23a side relative to the rib 30. The tube fixing portion 47 is provided on the first opening 22a side relative to the loop portion 43. The loop portion 43 is provided between the tube fixing portion 47 and the retractable section 41.

The protector 20 and the electric wire 40 are fixed via the attachment portion 26, the corrugated tube 50, the fastening member 60, and the adhesive tape 70. The electric wire 40 and the corrugated tube 50 are fixed by the adhesive tape 70. The protector 20 and the corrugated tube 50 are fixed by the attachment portion 26, the recessed portion 54 on the outer side of the small-diameter tube portion 51, and the fastening member 60.

The rib 30 is fitted into the recessed portion 54 formed between two large-diameter tube portions 52, on the outer side of the corresponding small-diameter tube portion 51. When the corrugated tube 50 is pulled in the extending direction, the rib 30 is caught by the connecting wall 53 that connects the outer circumferential face of the small-diameter tube portion 51 to the outer circumferential face of the large-diameter tube portion 52. Here, the electric wire 40 presses the corrugated tube 50 toward the bottom portion 28 due to the fastening member 60 fastening the extension portion 27, the electric wire 40, and the corrugated tube 50. This configuration prevents the corrugated tube 50 from deforming so as to make the recessed portion 54 become smaller even when the connecting wall 53 is pushed by the rib 30, and the rib 30 is more likely to remain fitted into the recessed portion 54.

<Operation Performed to Wire Harness>

The wire harness 10 is attached to a portion of the vehicle that moves. Specifically, the protector 20 is fixed to the vehicle body. An area of the electric wire 40 that extends from the second opening 23a of the protector 20 is fixed to a movable member. The movable member is movably attached to the vehicle body. The movable member is, for example, a seat 80 of the vehicle. The seat 80 has a lower frame 81 that is movably attached to a floor panel 82 via rails 83. The area of the electric wire 40 that is fixed to the seat 80 includes a seat protector 72, for example. The area of the electric wire 40 that is fixed to the seat protector 72 is movable together with the seat 80 relative to the vehicle body 82.

The retractable section 41 of the electric wire 40 is pulled out from or retracted into the protector 20 with the movement of the seat 80. Specifically, the seat 80 can move back and forth between a position P1 (the position indicated by solid lines in FIG. 1), which is closer to the protector 20, and a position P2 (the position indicated by two-dot chain lines in FIG. 1), which is farther from the protector 20 than the position P1. When the seat 80 is located at the position P1, the retractable section 41 has been retracted into the protector 20 to the maximum degree (the state shown in FIG. 6). When the seat 80 moves from the position P1 to the position P2, the retractable section 41 is sequentially pulled out from the protector 20. When the seat 80 is located at the position P2, the retractable section 41 has been pulled out the protector 20 to the maximum degree (the state shown in FIG. 7). When the seat 80 moves from the position P2 to the position P1, the retractable section 41 is sequentially retracted into the protector 20. When the seat 80 reaches the position P1, the retractable section 41 returns to the state of having been retracted into the protector 20 to the maximum degree (the state shown in FIG. 6).

It is possible that, with the protector 20 fixed to the vehicle body 82 by the vehicle fixing portion 35, the area of the electric wire 40 that extends out from the first opening 22a and the area that extends out from the second opening 23a are pulled. For example, after the protector 20 of the wire harness 10 is first fixed to the vehicle, it is possible that the first end portion and the second end portion of the electric wire 40 are pulled when the first and second end portions of the electric wire 40 are routed for connection to a device 90 or the like. It is also possible that the second end portion of the electric wire 40 is pulled when the outer section 42 of the electric wire 40 that extends out from the second opening 23a moves together with the movement of the seat 80. In these cases, it is possible that the section of the corrugated tube 50 that is attached to the protector 20 may be pulled by the electric wire 40. Even in such cases, the corrugated tube 50 is unlikely to come off from the protector 20 due to the rib 30 of the protector 20 being fitted into the recessed portion on the outer side of the small-diameter tube portion 51 of the corrugated tube 50. Further, even when the outer section 42 moves back and forth together with the seat 80, an end portion of the area of the electric wire 40 that extends out from the first opening 22a and the connector 48 connected to this end portion are prevented from being pulled toward the protector 20 due to the electric wire 40 being fixed to the attachment portion 26 via the corrugated tube 50. This configuration prevents the end portion of the electric wire 40 from being disconnected from the connector 48, and prevents the connector 48 from being disconnected from the device 90 or a counterpart connector.

Variation

Figure 8:
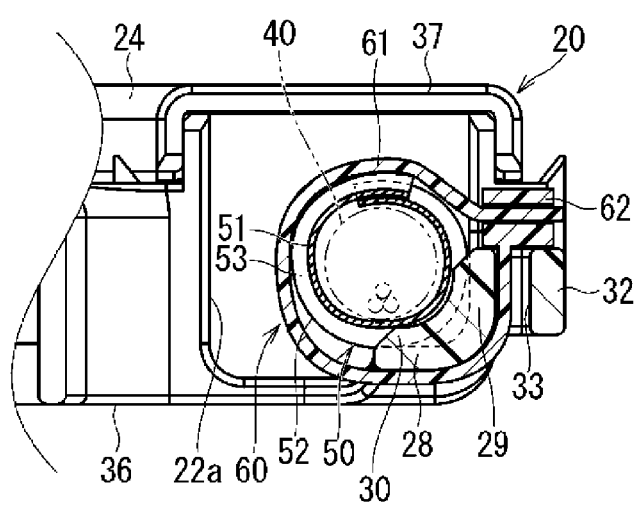
FIG. 8 is a cross-sectional view of a wire harness according to a variation.
Figure 9:
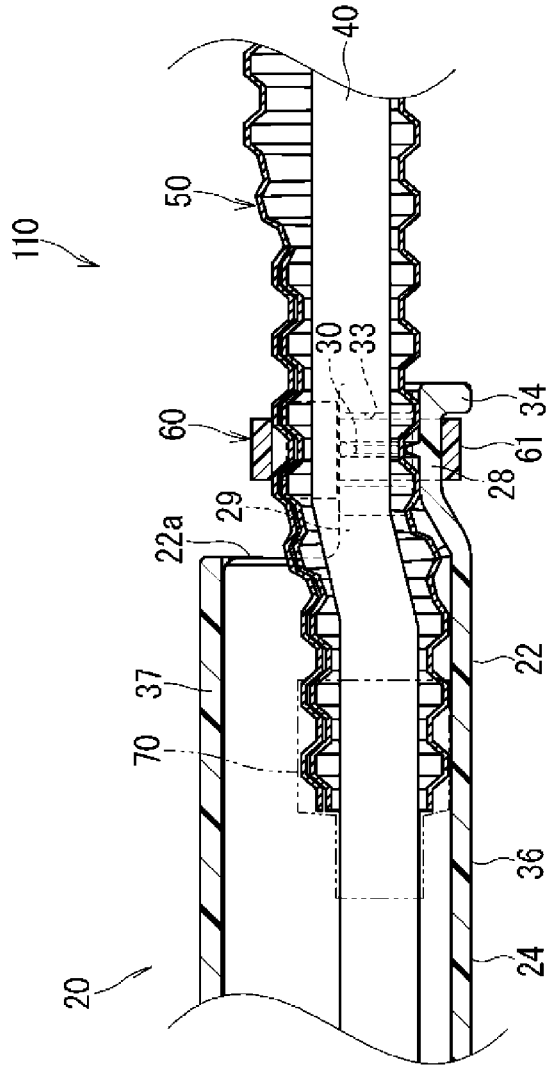
FIG. 9 is a cross-sectional view of a wire harness according to the variation.

FIGS. 8 and 9 are cross-sectional views of a wire harness 110 according to a variation. FIG. 8 corresponds to the lateral cross-section shown in FIG. 3, and FIG. 9 corresponds to the vertical cross-section shown in FIG. 2.

The outer diameter of the electric wire 40 is smaller than the inner diameter of the corrugated tube 50. If the electric wire 40 includes more than one electric wire, the outer diameter of the electric wire 40 refers to the outer diameter of the bundle of the electric wires included in the electric wire 40. In the present disclosure, the second end portion of the electric wire 40 is connected to the device 90 in the seat 80. The number of electric wires included in the electric wire 40 is determined in accordance with the number of devices 90, or the type or the like of the device(s) 90 in the seat 80. The device 90 in the seat 80 may include at least one optional device that can be selected by the user. The number of electric wires included in the electric wire 40 varies depending on whether or not any optional device is adopted. The smaller the number of optional devices adopted is, the smaller the number of electric wires included in the electric wire 40 is, and the smaller the outer diameter of the electric wire 40 (the outer diameter of the electric wire 40 bundle) is. The larger the number of optional devices adopted is, the larger the number of electric wires included in the electric wire 40 is, and the larger the outer diameter of the electric wire 40 (the outer diameter of the electric wire 40 bundle) is. The outer diameter of the electric wire 40 (the outer diameter of the electric wire 40 bundle) may be, for example, the same as or smaller than the width dimension of the bottom portion 28.

The corrugated tube 50 has the same size as the corrugated tube 50 of Embodiment 1. The corrugated tube 50 is deformed such that a first end portion and a second end portion thereof in the circumferential direction overlap each other in the circumferential direction. The first end portion and the second end portion in the circumferential direction are areas corresponding to the edges of the slit 55. Thus, the corrugated tube 50 shrinks. Note that, when the corrugated tube 50 shrinks, it is possible that the corrugated tube 50 is deformed into a shape other than the shape in the example shown in FIG. 9 (a non-circular shape). For example, if a direction in which the corrugated tube 50 is sandwiched by the fastening member 60 and the extension portion 27 is referred to as a first direction, and a direction perpendicular to the first direction is referred to as a second direction, it is also possible that the corrugated tube 50 is deformed into an oval shape that is longer in the second direction than in the first direction. In an area where, for example, neither the fastening member 60 nor the adhesive tape 70 is provided, the corrugated tube 50 need not be in intimate contact with the electric wire 40 bundle, and there may be a gap.

It is favorable that the overlapping area of the corrugated tube 50 is provided at a position avoiding the rib 30 in the circumferential direction of the electric wire 40, and deformation of the area of the corrugated tube 50 that comes into contact with the rib 30 is suppressed. With this configuration, even if the corrugated tube 50 is shrunk, favorable contact between the corrugated tube 50 and the rib 30 can be achieved, and the rib 30 is more likely to be appropriately caught by the corrugated tube 50. For example, it is favorable that the overlapping area of the corrugated tube 50 is located in an area that comes into contact with the fastening member 60.

The corrugated tube 50 is maintained in the deformed state by the fastening member 60. If the corrugated tube 50 is shrunk in advance near the fastening member 60 when the corrugated tube 50 is fixed to the electric wire 40 by the adhesive tape 70, the corrugated tube 50 can be easily kept in the shape shrunk by the adhesive tape 70 even at the position of the fastening member 60, and can be easily shrunk in a predetermined shape.

Effects, Etc.

According to the wire harnesses 10 and 110 that are configured as described above, a part of the corrugated tube 50 that extends in the circumferential direction is covered by the attachment portion 26, and another part is fastened towards the attachment portion 26 by the fastening member 60, thereby keeping the rib 30 of the attachment portion 26 fitted into the recessed portion on the outer side of the small-diameter tube portion 51. Instead of the attachment portion 26 not covering the entire circumference of the corrugated tube 50, the fastening member 60 is provided in the area of the corrugated tube 50 that is not covered by the attachment portion 26. Thus, the attachment portion 26 and the fastening member 60 can deal with corrugated tubes 50 of diverse diameters.

Further, the rib 30 is provided at only one location in the extending direction of the extension portion 27. This makes it easy for the rib 30 to be fitted into the recessed portion on the outer side of the small-diameter tube portion 51 even for two or more types of corrugated tubes 50 with different spacings between adjacent small-diameter tube portions 51 in the extending direction. If ribs 30 are provided at a plurality of locations in the extending direction of the extension portion 27, it may be difficult to deal with a corrugated tube 50 in which the spacing between adjacent small-diameter tube portions 51 does not match the spacing of the ribs 30.

Further, the attachment portion 26 has the restricting portion 31 that is provided on the outer side of the extension portion 27 and restricts the position of the fastening member 60. This makes it unlikely for the fastening member 60 to be displaced relative to the attachment portion 26.

The fastening member 60 is provided at the same position as the rib 30 in the extending direction of the extension portion 27. With this configuration, the fastening member 60 fastens the area of the corrugated tube 50 on the side opposite to the side where the rib 30 is located in the circumferential direction, thus making it unlikely for the rib 30 to come off from the small-diameter tube portion 51.

The corrugated tube 50 is fixed to the electric wire 40. The protector 20 is fixed to the electric wire 40 via the corrugated tube 50 on the first opening 22a side, and is not fixed to the electric wire 40 on the second opening 23a side. The electric wire 40 includes the retractable section 41 that is pulled out from and retracted into the protector 20 through the second opening 23a. With this configuration, the electric wire 40 being fixed to the protector 20 via the corrugated tube 50 on the first opening 22a side allows the pull-out/retract operation to be smoothly performed to the retractable section 41 on the second opening 23a side.

Further, the accommodating portion 21 has the second passage portion 23 having the second opening 23a, and the accommodation body 24 that is connected to the second passage portion 23 and larger than the second passage portion 23. The accommodation body 24 accommodates the electric wire 40 corresponding to the difference between the wire length in the accommodating portion 21 in the state where the retractable section 41 has been retracted and the wire length in the accommodating portion 21 in the state where the retractable section 41 has been pulled out. With this configuration, it is possible to easily accommodate, in the accommodating portion 21, the electric wire 40 corresponding to the difference between the wire length in the accommodating portion 21 in the state where the retractable section 41 has been retracted and the wire length in the accommodating portion 21 in the state where the retractable section 41 has been pulled out.

The electric wire 40 has the loop portion 43 that is accommodated in the accommodation body 24, and the accommodating portion 21 has the pin 25 that extends through the loop portion 43. The loop portion 43 around the pin 25 in the state where the retractable section 41 has been retracted is larger than the loop portion 43 around the pin 25 in the state where the retractable section 41 has been pulled out. This enables the pin 25 to restrict the position of the loop portion 43 of the electric wire 40, thus allowing the pull-out/retract operation to be smoothly performed to the retractable section 41.

The protector 20 includes the body portion 36 having the bottom portion and the side wall portion, and the lid portion 37 serving as a lid of the body portion 36. The first extension area 44 of the electric wire 40 that extends from the intermediate area of the loop portion 43 toward the first opening 22a passes closer to the body portion 36 than the second extension area 45 that extends from the intermediate area of the loop portion 43 to the second opening 23a, at the intersection portion 46 where the first extension area 44 intersects the second extension area 45. With this configuration, when the protector 20 is disposed such that the body portion 36 is located vertically below the lid portion 37, the second extension area 45 of the electric wire 40 overlaps the first extension area 44 and is located vertically above the first extension area 44. As a result, the pull-out/retract operation can be performed smoothly even if the first extension area 44 and the second extension area 45 rub against each other at the intersection portion 46 during the pull-out/retract operation performed to the retractable section 41.

The end portion of the second passage portion 23 has a shape having a cross-sectional area that gradually increases toward the second opening 23*a*. This makes it unlikely for the electric wire 40 to be caught at an edge of the second opening 23*a* when the retractable section 41 is pulled out or retracted.

The protector 20 includes the vehicle fixing portion 35 that is fixed to the vehicle body. The electric wire 40 has the outer section 42 located outside the second opening 23*a* of the protector 20 in the state where the retractable section 41 has been retracted into the protector 20. The outer section 42 of the electric wire 40 is fixed to the movable member 80 that is movable relative to the vehicle body 82. With this configuration, the area of the electric wire 40 on the first opening 22*a* side is fixed to the vehicle body 82 together with the protector 20, and the outer section 42 of the electric wire 40 moves relative to the vehicle body 82 together with the movable member 80. Thus, the retractable section 41 of the electric wire 40 is pulled out from or retracted into the protector 20 when the movable member 80 moves. Even in this case, the wire harness 10 is prevented from interfering with the movement of the movable member 80 since the retractable section 41 can be smoothly pulled out or retracted.

The electric wire 40 and the corrugated tube 50 are fixed by winding the adhesive tape 70 therearound on the second opening 23*a* side relative to the rib 30. With this configuration, the portion at which the electric wire 40 and the corrugated tube 50 are fixed is located on the second opening 23*a* side relative to the rib 30, thus making it unlikely for the corrugated tube 50 to be displaced relative to the electric wire 40 during the pull-out/retract operation.

The protruding dimension of the rib 30 from the extension portion 27 is smaller than or equal to the height from the small-diameter tube portion 51 to the large-diameter tube portion 52 of the corrugated tube 50. This configuration prevents the rib 30 from pushing the small-diameter tube portion 51 when the fastening member 60 fastens the corrugated tube 50, thereby suppressing excessive deformation of the corrugated tube 50. As a result, the corrugated tube 50 can be prevented from being excessively deformed and weakening the locking between the rib 30 and the corrugated tube 50.

The size of the rib 30 in the extending direction of the electric wire 40 is the same as or smaller than that of the recessed portion on the outer side of the small-diameter tube portion 51. This configuration prevents the rib 30 from pushing the corrugated tube 50 when the fastening member 60 fastens the corrugated tube 50, thereby suppressing excessive deformation of the corrugated tube 50. As a result, the corrugated tube 50 can be prevented from being excessively deformed and weakening the locking between the rib 30 and the corrugated tube 50.

According to the wire harness 110, the outer diameter of the electric wire 40 is smaller than the inner diameter of the corrugated tube 50. The corrugated tube 50 is deformed such the first end portion and the second end portion thereof in the circumferential direction overlap each other in the radial direction, and the fastening member 60 maintains the deformed state. This configuration can realize different diameters using one type of corrugated tube 50. Since the corrugated tube 50 is maintained in the deformed state in which the first end portion and the second end portion thereof in the circumferential direction overlap each other in the radial direction, there is less room for further deformation of the corrugated tube 50. Thus, the rib 30 can be prevented from coming off from the small-diameter tube portion 51 due to further deformation of the corrugated tube 50.

Supplementary Notes

In the above description, the rib 30 is located at only one location in the extending direction of the extension portion 27, but this is not an essential configuration. For example, ribs 30 may alternatively be provided at a plurality of locations in the extending direction of the extension portion 27.

In the above description, the attachment portion 26 has the restricting portion 31 that is provided on the outer side of the extension portion 27 and restricts the position of the fastening member 60, but this is not an essential configuration. For example, the attachment portion 26 need not necessarily have the restricting portion 31.

In the above description, the fastening member 60 is located at the same position as the rib 30 in the extending direction of the extension portion 27, but this is not an essential configuration. For example, the fastening member 60 may alternatively be located at a different position from the rib 30 in the extending direction of the extension portion 27.

In the above description, the corrugated tube 50 is fixed to the electric wire 40. The protector 20 is fixed to the electric wire 40 via the corrugated tube 50 on the first opening 22*a* side, and is not fixed to the electric wire 40 on the second opening 23*a* side. The electric wire 40 includes the retractable section 41 that is pulled out from and retracted into the protector 20 through the second opening 23*a*. However, this is not an essential configuration. For example, the electric wire 40 need not necessarily have the retractable section 41, and the protector 20 may also be fixed to the electric wire 40 on the second opening 23*a* side.

In the above description, the accommodating portion 21 has the second passage portion 23 that has the second opening 23*a*, and the accommodation body 24 that is connected to the second passage portion 23 and is wider than the second passage portion 23. The accommodation body 24 accommodates the electric wire 40 corresponding to the difference between the wire length in the accommodating portion 21 in the state where the retractable section 41 has been retracted and the wire length in the accommodating portion 21 in the state where the retractable section 41 has been pulled out. However, this is not an essential configuration. For example, the accommodating portion 21 need not necessarily have the second passage portion 23.

In the above description, the electric wire 40 has the loop portion 43 that is accommodated in the accommodation body 24, the accommodating portion 21 has the pin 25 that extends through the loop portion 43. The loop portion 43 around the pin 25 in the state where the retractable section 41 has been retracted is larger than the loop portion 43 around pin 25 in the state where the retractable section 41 has been pulled out. However, this is not an essential configuration. For example, the electric wire 40 need not necessarily have the loop portion 43. For example, the electric wire 40 may have a bent portion that is bent within the accommodating portion 21, and the path length of the bent portion may change between a state in which the retractable section 41 has been retracted and a state in which the retractable section 41 has been pulled out.

In the above description, the protector 20 includes the body portion 36 having the bottom portion and the side wall portion, and the lid portion 37 serving as a cover of the body portion 36. The first extension area 44 passes closer to the body portion 36 than the second extension area 45, at the intersection portion 46 of the electric wire 40 where the first extension area 44 extending from the intermediate area of the loop portion 43 toward the first opening 22*a* intersects the second extension area 45 extending from the intermediate area to the second opening 23*a* of the loop portion 43. However, this is not an essential configuration. For example, the first extension area 44 may alternatively pass on the lid portion 37 side relative to the second extension area 45 at the intersection portion 46.

In the above description, the end portion of the second passage portion 23 has a shape having a cross-sectional area that gradually increases toward the second opening 23*a*. However, this is not an essential configuration. For example, the end portion of the second passage portion 23 may have a cross-sectional area that is uniform toward the second opening 23*a*.

In the above description, the protector 20 includes the vehicle fixing portion 35 that is fixed to the vehicle body 82. The electric wire 40 has the outer section 42 located outside the second opening 23*a* of the protector 20 in the state where the retractable section 41 has been retracted into the protector 20. The outer section 42 of the electric wire 40 is fixed to the movable member 80 that is movable relative to the vehicle body 82. However, this is not an essential configuration. For example, the outer section 42 of the electric wire 40 may alternatively be fixed to an openable/closable member that can be opened and closed relative to the vehicle body 82.

In the above description, the electric wire 40 and the corrugated tube 50 are fixed by winding the adhesive tape 70 therearound on the second opening 23*a* side relative to the rib 30. However, this is not an essential configuration. For example, the electric wire 40 and the corrugated tube 50 may alternatively be fixed by winding the adhesive tape 70 therearound on the side opposite to the second opening 23*a* side relative to the rib 30.

In the above description, the protruding dimension of the rib 30 from the extension portion 27 is smaller than or equal to the height from the small-diameter tube portion 51 to the large-diameter tube portion 52 of the corrugated tube 50. However, this is not an essential configuration. For example, the protruding dimension of the rib 30 from the extension portion 27 may alternatively be larger than the height from the small-diameter tube portion 51 to the large-diameter tube portion 52 of the corrugated tube 50.

In the above description, the dimension of the rib 30 in the extending direction of the electric wire 40 is smaller than or equal to the dimension of the small-diameter tube portion 51, but this is not an essential configuration. For example, the dimension of the rib 30 in the extending direction of the electric wire 40 may be partially larger than the dimension of the small-diameter tube portion 51.

The wire harness 110 employs the corrugated tube 50 having the same size as the corrugated tube 50 of Embodiment 1 is adopted, and the corrugated tube 50 is deformed such that the first end portion and the second end portion thereof in the circumferential direction overlap each other in order to deal with smaller electric wires 40. However, this is not an essential configuration. The wire harness 110 may alternatively employ a corrugated tube that is smaller than the corrugated tube 50 of Embodiment 1 and has a size corresponding to the electric wire 40. In the wire harness 110 as well, the first end portion and the second end portion of the corrugated tube 50 in the circumferential direction need not overlap each other, as in Embodiment 1.

Note that the configurations described in the above embodiment and variation can be combined as appropriate as long as no contradiction arises.

LIST OF REFERENCE NUMERALS

10 Wire harness
20 Protector
21 Accommodating portion
22 First passage portion
22*a* First opening
23 Second passage portion
23*a* Second opening
24 Accommodation body
25 Pin
25*h* Pin hole
26 Attachment portion
27 Extension portion
28 Bottom portion
29 Side wall
30 Rib
31 Restricting portion
32 Band insertion portion
33 Insertion hole
34 Protruding portion
35 Clip (vehicle fixing portion)
36 Body portion
36*a* Bottom portion
36*b*, 36*c* Side wall
37 Lid portion
38 Hinge
39*a* Locking portion
39*b* Counterpart locking portion
40 Wire
41 Retractable section
42 Outer section
43 Loop portion
44 First extension area
45 Second extension area
46 Intersection portion
47 Tube fixing portion
48 Connector
50 Corrugated tube
51 Small-diameter portion
52 Large-diameter portion
53 Connecting wall
54 Recessed portion
55 Slit
60 Cable tie (fastening member)
61 Band
62 Band fixing portion
63 Base
64 Through-hole
70 Adhesive tape
71 Twisted tube
72 Seat protector
80 Seat (movable member)
81 Frame
82 Floor panel (vehicle body)
83 Rail
90 Device

What is claimed is:

1. A wire harness comprising:
a protector including: an accommodating portion having a first opening and a second opening; and an attachment portion provided on the first opening side of the accommodating portion;
an electric wire passing through the accommodating portion via the first opening and the second opening;
a corrugated tube including a small-diameter tube portion and a large-diameter tube portion that are alternately continuous with each other, the corrugated tube covering at least an area of the electric wire that extends along the attachment portion; and
a fastening member fastening the corrugated tube and the attachment portion by being wound around the corrugated tube and the attachment portion,
wherein the attachment portion has: an extension portion extending outside the corrugated tube in an extending direction of the electric wire and having a bottom surface and a side wall; and a rib protruding from the extension portion toward the small-diameter tube portion of the corrugated tube and fitted into a recessed portion on an outer side of the small-diameter tube portion,
a part of the corrugated tube that extends in a circumferential direction thereof is covered by the attachment portion, and another part of the corrugated tube is fastened toward the attachment portion by the fastening member, and
the attachment portion has a restricting portion that is provided on an outer side of the extension portion and restricts a position of the fastening member, and the restricting portion has a band insertion portion that is provided on an outer face of the side wall of the extension portion and allows the fastening member to pass therethrough.

2. The wire harness according to claim 1,
wherein the rib is provided at only one location in an extending direction of the extension portion.

3. The wire harness according to claim 1,
wherein the fastening member is provided at the same position as the rib in the extending direction of the extension portion.

4. The wire harness according to claim 1,
wherein the corrugated tube is fixed to the electric wire,
the protector is fixed to the electric wire via the corrugated tube on the first opening side, and is not fixed to the electric wire on the second opening side, and
the electric wire includes a retractable section that is pulled out from and retracted into the protector through the second opening.

5. The wire harness according to claim 4,
wherein the accommodating portion has: a passage portion having the second opening; and an accommodation body that is connected to the passage portion and is larger than the passage portion, and the accommodation body accommodates the electric wire corresponding to a difference between a wire length in the accommodating portion in a state where the retractable section has been retracted and a wire length in the accommodating portion in a state where the retractable section has been pulled out.

6. The wire harness according to claim 5,
wherein the electric wire has a loop portion accommodated in the accommodation body,
the accommodating portion has a pin extending through the loop portion, and
the loop portion around the pin in the state where the retractable section has been retracted is larger than the loop portion around the pin in the state where the retractable section has been pulled out.

7. The wire harness according to claim 6,
wherein the protector includes: a body portion having a bottom portion and a side wall portion; and a lid portion serving as a lid of the body portion, and
a first extension area of the electric wire passes on the body portion side relative to an second extension area of the electric wire at an intersection portion where the first extension area intersects the second extension area, the first extension area being an area of the electric wire that extends from an intermediate area of the loop portion toward the first opening, the second extension area of the electric wire being an area that extends from the intermediate area of the loop portion toward the second opening.

8. The wire harness according to claim 5,
wherein an end portion of the passage portion has a shape whose cross-sectional area gradually increases toward the second opening.

9. The wire harness according to claim 4,
wherein the protector includes a vehicle fixing portion that is to be fixed to a vehicle body,
the electric wire has an outer section located outside the second opening of the protector in a state where the retractable section has been retracted into the protector, and
the outer section of the electric wire is fixed to a movable member that is movable relative to the vehicle body.

10. The wire harness according to claim 4,
wherein the electric wire and the corrugated tube are fixed by winding an adhesive tape therearound at a portion of the corrugated tube that is located on a side toward the second opening relative to the rib.

11. The wire harness according to claim 1,
wherein a protruding dimension of the rib from the extension portion is smaller than or equal to a height from the small-diameter tube portion to the large-diameter tube portion of the corrugated tube.

12. The wire harness according to claim 1,
wherein the rib is smaller than or equal to the recessed portion on the outer side of the small-diameter tube portion, in the extending direction of the electric wire.

13. The wire harness according to claim 1,
wherein an outer diameter of the electric wire is smaller than an inner diameter of the corrugated tube, and
the corrugated tube is deformed such that a first end portion and a second end portion thereof in the circumferential direction overlap each other in a radial direction, and the fastening member maintains the deformed state.

* * * * *